US010937114B2

(12) United States Patent
Franklin, Jr. et al.

(10) Patent No.: US 10,937,114 B2
(45) Date of Patent: Mar. 2, 2021

(54) ELECTRIC LOADSHAPE FORECASTING FOR UTILITY SYSTEMS THAT SUPPORT DYNAMIC POWER PRICING

(71) Applicant: Oracle International Corporation, Redwood Shores, CA (US)

(72) Inventors: Benjamin P. Franklin, Jr., Jasper, GA (US); Kenny C. Gross, Escondido, CA (US); Cornell Thomas Eyford, III, Ridgefield, WA (US); Bradley R. Williams, Brush Prairie, WA (US)

(73) Assignee: Oracle International Corporation, Redwood Shores, CA (US)

( * ) Notice: Subject to any disclaimer, the term of this patent is extended or adjusted under 35 U.S.C. 154(b) by 123 days.

(21) Appl. No.: 16/355,127

(22) Filed: Mar. 15, 2019

(65) Prior Publication Data
US 2019/0295190 A1    Sep. 26, 2019

Related U.S. Application Data

(60) Provisional application No. 62/648,137, filed on Mar. 26, 2018.

(51) Int. Cl.
| | | |
|---|---|---|
| *G06Q 50/06* | (2012.01) | |
| *G06Q 10/06* | (2012.01) | |
| *G06Q 30/02* | (2012.01) | |

(52) U.S. Cl.
CPC ....... *G06Q 50/06* (2013.01); *G06Q 10/06315* (2013.01); *G06Q 30/0206* (2013.01)

(58) Field of Classification Search
CPC .......................................... G06Q 10/00–50/00
(Continued)

(56) References Cited

U.S. PATENT DOCUMENTS 6,366,889 B1 *   4/2002   Zaloom .................. G06Q 10/04
                                                                 705/7.37
6,611,726 B1 *   8/2003   Crosswhite ............. G06F 17/18
                                                                 700/99
(Continued)

OTHER PUBLICATIONS

Almeshaiei et al, "A methodology for Electric Power Load Forecasting", Jul. 27, 2011, Alexandria University, pp. 8 (Year: 2011).*

(Continued)

*Primary Examiner* — Alan S Miller
(74) *Attorney, Agent, or Firm* — Park, Vaughan, Fleming & Dowler LLP

(57) ABSTRACT

During operation, the system receives a set of input signals containing electrical usage data from a set of smart meters, which gather electrical usage data from customers of the utility system. The system uses the set of input signals and a projection technique to produce projected loadshapes, which are associated with electricity usage in the utility system. Next, the system identifies a closest time period in a database containing recent empirically obtained load-related parameters for the utility system, wherein the load-related parameters in the closest time period are closest to a present set of load-related parameters for the utility system. The system then iteratively adjusts the projected loadshapes based on changes indicated by the load-related parameters in the closest time period until a magnitude of adjustments falls below a threshold. Finally, the system predicts electricity demand for the utility system based on the projected loadshapes.

18 Claims, 5 Drawing Sheets

(58) Field of Classification Search
USPC ............................................. 705/7.11–7.42
See application file for complete search history.

(56) References Cited

U.S. PATENT DOCUMENTS

| | | | | |
|---|---|---|---|---|
| 6,785,592 B1* | 8/2004 | Smith | ................... | G06Q 50/06 |
| | | | | 700/291 |
| 8,019,697 B2* | 9/2011 | Ozog | ................... | H02J 13/0006 |
| | | | | 705/412 |
| 8,364,609 B2* | 1/2013 | Ozog | ................... | H02J 13/0006 |
| | | | | 705/412 |
| 8,706,650 B2* | 4/2014 | Ozog | ................... | G06Q 10/06 |
| | | | | 705/412 |
| 8,880,233 B2* | 11/2014 | Kearns | ................... | H02J 3/32 |
| | | | | 700/295 |
| 8,983,669 B2* | 3/2015 | Forbes, Jr. | ........ | H02J 13/00028 |
| | | | | 700/286 |
| 9,209,625 B2* | 12/2015 | Tyagi | ................... | H02J 3/28 |
| 10,366,403 B2* | 7/2019 | Yu | ................... | G06Q 30/0206 |
| 2002/0022985 A1* | 2/2002 | Guidice | ............ | G06Q 10/0875 |
| | | | | 700/28 |
| 2003/0009401 A1* | 1/2003 | Ellis | ................... | G06Q 30/04 |
| | | | | 705/35 |
| 2003/0158826 A1* | 8/2003 | Burke | ................... | G01D 4/002 |
| | | | | 705/412 |
| 2004/0088211 A1* | 5/2004 | Kakouros | ........ | G06Q 10/06395 |
| | | | | 705/7.31 |
| 2004/0215529 A1* | 10/2004 | Foster | ................... | G06Q 30/06 |
| | | | | 705/26.1 |
| 2005/0143865 A1* | 6/2005 | Gardner | ............ | H02J 13/00002 |
| | | | | 700/291 |
| 2010/0114387 A1* | 5/2010 | Chassin | ................ | G06Q 40/04 |
| | | | | 700/286 |
| 2010/0179704 A1* | 7/2010 | Ozog | ................... | H02J 13/0006 |
| | | | | 700/291 |
| 2010/0179862 A1* | 7/2010 | Chassin | ................... | H02J 3/008 |
| | | | | 705/412 |
| 2010/0324962 A1* | 12/2010 | Nesler | ................... | G05B 17/02 |
| | | | | 705/7.36 |
| 2011/0172837 A1* | 7/2011 | Forbes, Jr. | ................ | H02J 3/14 |
| | | | | 700/291 |
| 2012/0330631 A1* | 12/2012 | Emigholz | ............ | G05B 13/048 |
| | | | | 703/2 |
| 2013/0282193 A1* | 10/2013 | Tyagi | ................... | H02J 3/008 |
| | | | | 700/291 |
| 2014/0277808 A1* | 9/2014 | Irisarri | ................... | G05B 15/02 |
| | | | | 700/295 |
| 2014/0324532 A1* | 10/2014 | Ghosh | ................ | G06Q 30/0202 |
| | | | | 705/7.31 |
| 2014/0336960 A1* | 11/2014 | Haghighat-Kashani | ...................... | |
| | | | | G06F 16/212 |
| | | | | 702/60 |
| 2015/0120269 A1* | 4/2015 | Dannecker | ............ | G06F 30/20 |
| | | | | 703/18 |
| 2016/0187395 A1* | 6/2016 | Bodas | ................... | G06Q 50/06 |
| | | | | 702/60 |
| 2017/0371308 A1* | 12/2017 | Ghosh | ................ | G06Q 10/0631 |

OTHER PUBLICATIONS

Hoff, "Electric grid operators forecast load shapes to plan electricity supply", Jul. 22, 2106, US Energy Information Administration, pp. 2 (Year: 2016).*

Gotham et al, "Energy Forecasting Methods", Nov. 15, 2007, Purdue University, pp. 48 (Year: 2007).*

Philip, "Methods for Analyzing Electric Load Shape and its Variability", Aug. 25, 2010, Lawrence Berkeley National Laboratory, pp. 62 (Year: 2010).*

Ruderman et al, "Residential End-Use Load Shape Data Analysis", Apr. 1989, University of California, pp. 62 (Year: 1989).*

Crowley et al, "Weather Effects on Electricity Loads: Modeling and Forecasting", Dec. 12, 2005, The George Washington University, pp. 4 (Year: 2005).*

* cited by examiner

ELECTRIC LOADSHAPE FORECASTING FOR UTILITY SYSTEMS THAT SUPPORT DYNAMIC POWER PRICING

RELATED APPLICATION

This application claims priority under 35 U.S.C. § 119 to U.S. Provisional Application No. 62/648,137, entitled "Electrical Distribution System Economic Optimization Engine" by inventors Benjamin P. Franklin, Jr., Kenny C. Gross, Bradley R. Williams and Cornell Eyford III, filed on 26 Mar. 2018, the contents of which are incorporated by reference herein.

BACKGROUND

Field

The disclosed embodiments generally relate to techniques for performing electricity demand forecasting to further the ongoing operations of a utility company. More specifically, the disclosed embodiments relate to a technique that facilitates optimized electric loadshape forecasting for utility systems that support dynamic power pricing.

Related Art

The daily operations of an electric utility, such as fuel resource planning and making strategic real-time decisions to balance the supply and demand for electricity, are strongly influenced by forecasts for electrical demand. There often exists a 10 to 20 times difference in cost between a utility's base load-generation sources in comparison to purchases made through the electrical grid at spot-market rates to ensure that customer demands are met. Such demand forecasts are used by electrical utilities to perform important operations, such as: demand-side management; storage maintenance and scheduling; integration of renewable energy sources; selling surplus power on the grid; coordinating the availability of cheaper power through alternative means, such as energy exchanges; creating bilateral electricity supply agreements; and minimizing the need to purchase expensive electricity from the grid at spot-market rates.

Real-time, short-term loadshape forecasting has become a topic of intense interest because of the significant cost savings that a utility can realize through accurate forecasting of demand over the upcoming 15 minutes to four hours as well as more accurate day-ahead forecasts. In the past, utilities obtained such forecasts from historical aggregate supply curves for metropolitan areas served by the utility.

Researchers are beginning to develop improved techniques for loadshape forecasting based on usage data obtained from smart meters, which provide fine-grained data about the varying electrical usage for individual customers. (For example, see U.S. Patent Application No. 62/648,137, entitled "Electrical Distribution System Economic Optimization Engine" by inventors Benjamin P. Franklin, Jr., et al., filed on 26 Mar. 2018.) These improved loadshape forecasting techniques operate by using an inferential model trained using: historical smart meter advanced metering infrastructure (AMI) signals, weather data, and the real-time consumption loads obtained from AMI signals to forecast the most likely loadshapes in upcoming one-hour, four-hour, or 24-hour time intervals.

These existing loadshape-forecasting techniques all assume that power prices are constant. However, recently developed "smart grid" systems are beginning to support "dynamic power pricing," wherein power prices dynamically adjust based on current demand, and the resulting dynamic pricing information is communicated to consumers in real time. For example, some European regions already have such smart grid systems that provide hourly variable power prices to consumers through smartphone apps. This enables the consumers to adjust their power usage as they see costs changing. However, as consumers adjust their power usage, aggregate demand changes, which in turn changes the cost of the power. This "feedback effect" leads to highly nonlinear variations in electrical demand, which cannot be accurately predicted using existing loadshape-forecasting techniques.

Hence, what is needed is a technique for more accurately forecasting electrical demand in utility systems that support dynamic power pricing.

SUMMARY

The disclosed embodiments relate to a system that forecasts electricity demand in a utility system that supports dynamic pricing. During operation, the system receives a set of input signals containing electrical usage data from a set of smart meters, which gather electrical usage data from customers of the utility system. The system then uses the set of input signals and a projection technique to produce projected loadshapes, which are associated with electricity usage in the utility system. Next, the system optimizes the projected loadshapes to account for nonlinear effects resulting from the dynamic pricing. During this process, the system identifies a closest time period in a database containing recent empirically obtained load-related parameters for the utility system, wherein the load-related parameters in the closest time period are closest to a present set of load-related parameters for the utility system. The system then iteratively adjusts the projected loadshapes based on changes indicated by the load-related parameters in the closest time period until a magnitude of adjustments falls below a threshold. Finally, the system predicts electricity demand for the utility system based on the projected loadshapes.

In some embodiments, the load-related parameters include one or more of the following: a present time of day; a present demand for electricity; a present cost for electricity; and a present rate of change in the cost for electricity.

In some embodiments, the method further comprises using the predicted electricity demand to control a supply of electricity provided by the utility system.

In some embodiments, controlling the supply of electricity provided by the utility system comprises one or more of the following: controlling an amount of electricity produced by one or more power plants in the utility system; purchasing electricity for the utility system through a power grid; selling electricity produced by the utility system through the power grid; storing electricity for future use by the utility system; and making plans to construct a new power plant for the utility system.

In some embodiments, while using the set of input signals and the projection technique to produce projected loadshapes, the system uses the set of input signals to train an inferential model, which learns correlations among the set of input signals. Next, the system uses the inferential model to produce a set of inferential signals, wherein the inferential model produces an inferential signal for each input signal in the set of input signals. The system then uses a Fourier-based decomposition-and-reconstruction technique, which decomposes each signal in the set of inferential signals into deterministic and stochastic components, and uses the deterministic and stochastic components to generate a set of synthesized signals, which are statistically indistinguishable from the inferential signals. Finally, the system projects the set of synthesized signals into the future to produce the projected loadshape for the electricity demand for the utility system.

In some embodiments, while generating the set of synthesized signals, the system first generates a set of un-normalized signals. Next, the system performs an ambient-weather-normalization operation on the set of un-normalized signals to generate the set of synthesized signals, wherein the ambient-weather-normalization operation uses historical, current and predicted weather measurements and historical electrical usage data to adjust the set of un-normalized signals to account for effects of weather on the forecast for electricity demand.

In some embodiments, while using the Fourier-based decomposition-and-reconstruction technique to generate the set of synthesized signals, the system uses a telemetry parameter synthesis (TPSS) technique, which creates a high-fidelity synthesis equation that is used to generate the set of synthesized signals.

In some embodiments, the system additionally uses predicted reactive and resistive loads in the predicted electricity demand to optimize power factor correction operations for residential utility customers.

In some embodiments, the inferential model is trained using a Multivariate State Estimation Technique (MSET).

In some embodiments, receiving the set of input signals comprises receiving a set of AMI signals.

DETAILED DESCRIPTION

Figure 1A:
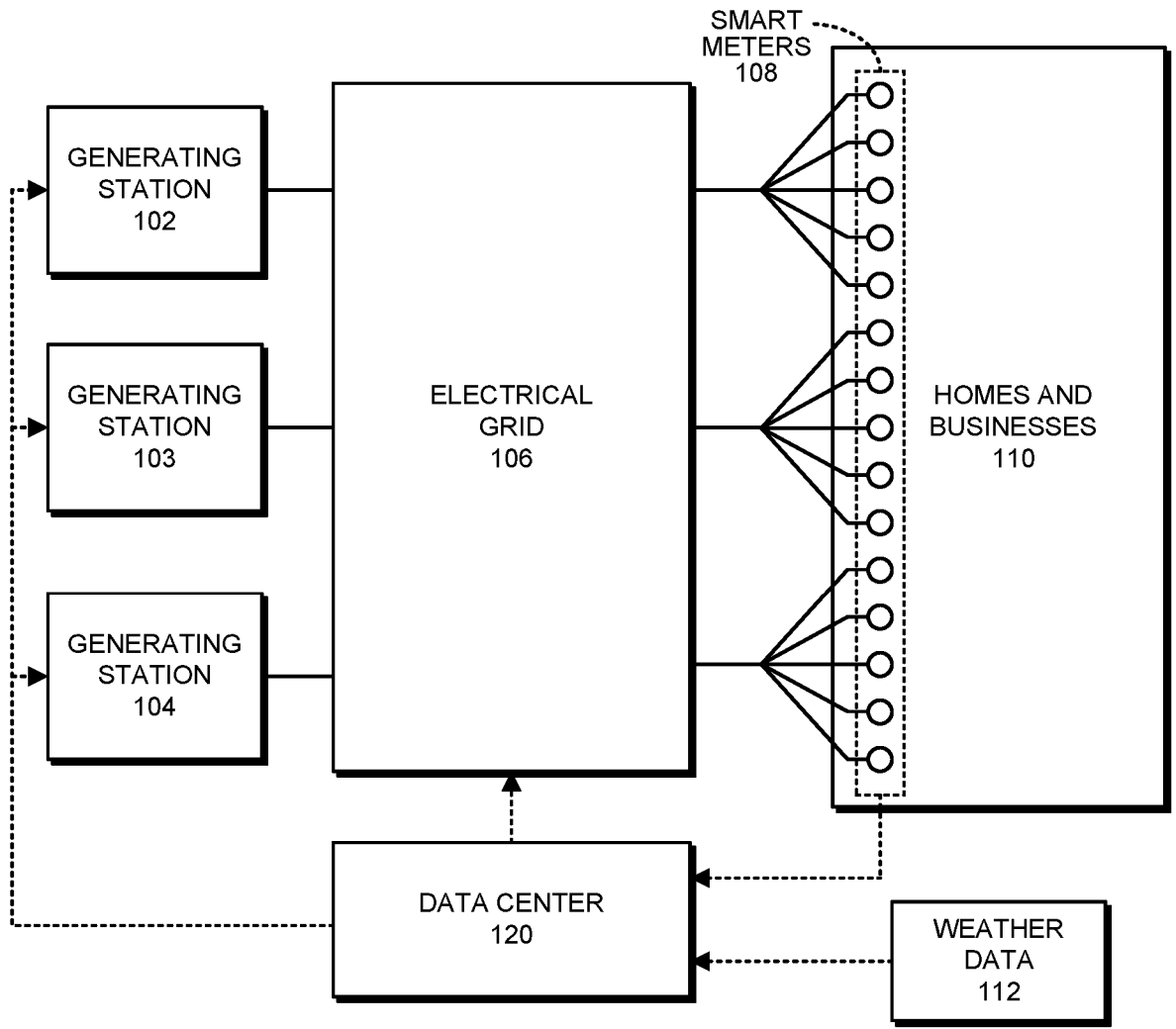
FIG. 1A illustrates an electric utility system comprising a set of generating stations connected to homes and businesses through an electrical grid in accordance with the disclosed embodiments.

The following description is presented to enable any person skilled in the art to make and use the present embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments. Thus, the present embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Overview

The disclosed embodiments facilitate operating an electrical generation and distribution system reliably and safely by maintaining appropriate voltages and balancing supply and demand in an economical manner under a variable pricing structure. To accomplish this, the disclosed embodiments use an empirical multiple-input, multiple-output (MIMO) control technique, which learns the nonlinear and delayed feedback-and-control interactions between various loadshape metrics on a real-time and look-ahead basis.

More specifically, during operation, the disclosed embodiments receive real-time AMI signals, commercially available local weather feeds, and pricing signals for regions that support smart grid variable pricing. The disclosed embodiments process these signals using an advanced machine-learning model (e.g., MSET) to balance supply and demand, and to optimize power factor correction operations for residential customers to avoid losses in residential distribution.

Hence, in addition to addressing the feedback-control loop that couples "load to variable-cost to induced-consumer-demand back to load," the disclosed embodiments also address the equally challenging relationship between reactive-load (from ACs, fluorescent lights, pool pumps) and alternating-current voltage/current phase, by dynamically adjusting capacitors in distribution feed lines. Note that this additional reactive-load-based feedback-control loop also depends on aggregate load, which in turn depends on the "load-cost-demand-load" control loop. These two interacting coupled-control loops also both depend on real-time solar-generated load, which depends on real-time cloud dynamics, as well as time of day and month of year, which affect irradiance-angle-factors.

However, integrating all of these nonlinear feedback-control parameters into a conventional mathematical MIMO-control technique would likely be intractable. This is because conventional MIMO-control techniques require mathematical functional relationships between measured variables and control-actuator metrics, and such mathematical functional relationships are not readily available and may not actually exist. Our new technique provides an alternative approach to achieve real-time empirical inferencing, which is continuously adaptable as relationships between continuously varying and interacting variables change due to varying cost, lagged consumer demand, real-time variation in sunshine, and the degree of reactive versus resistive loads.

More specifically, the disclosed embodiments use an inferential model to learn multiple loadshapes from historic log files, which contain various measurements, such as in kilowatt hours (kWhs) and kilovolt ampere hours (kVAs), from various systems, such as solar arrays, wind-generation systems, electric-vehicle charging stations, and local battery storage. This inferential model is subsequently used to predict distribution system power flows based on loadshapes and predicted changes in loadshapes caused by variations in: real-time weather, variable-pricing signals, the formula for adjusting the variable price, demand-response feedback, utility load-demand control actuators that do not have to change, such as turning on and off interruptible power supply sources (e.g., from high-cost gas turbines), and other feedback-control-related actions, such as automatically changing a customer's smart inverter power factor settings. The predicted power flows are then used to economically "balance" and "optimize" the load, voltage and current on the distribution grid feeder.

Our new technique uses an iterative process to optimize the loadshape forecast to account for nonlinearities. During the first iteration, the multiple loadshapes are projected forward, as if there were no feedback-control interactions between projected loadshapes and the most recent measured loadshapes, and as if there were no interacting feedback-control mechanisms between parallel loadshapes, such as a changing solar-generation component reducing a higher-cost base-load generation component, which reduces cost and increases demand.

During the second iteration, the projected loadshapes from the previous iteration are regressed (e.g., using nonlinear, nonparametric regression) against the historical database of signals in a "moving window" iterative procedure to identify the "closest" time period in the past that matches (e.g., based on a global $R^2$ goodness metric) the projected loadshapes and the first-time derivatives of the projected loadshapes. (We have empirically determined that the values of the loadshapes as well as their rates of change are correlated with past interaction dynamics among the collection of loadshapes.)

During the third and subsequent iterations, the newly projected loadshapes are regressed against the moving window historical loadshapes to more closely match the projected loadshapes and the first time derivatives of the projected loadshapes against the historical dynamic loadshapes and associated derivatives. This iterative process continues until the aggregate difference (e.g., root mean squared error (RMSE)) between the present iteration outputs and the previous iteration outputs fall to a less than 1% improvement.

This nonlinear empirical MIMO iterative loop is repeated periodically in a "bootstrapping" fashion, every time the loadshape projections start to deviate from new incoming measured loadshape observations. For example, the "trigger" to initiate a new invocation of the iterations can be activated when the most recent projections deviate by an aggregate RMSE of 2% as compared with the new incoming measured loadshapes.

Exemplary Utility System

FIG. 1A illustrates an exemplary utility system 100 comprising a set of generating stations 102-104 connected to homes and businesses 110 through an electrical grid 106 in accordance with the disclosed embodiments. The generating stations 102-104 can generally include any type of facility that generates electricity, such as a nuclear power plant, a solar power plant, a windmill or a windmill "farm", or a coal-fired, natural gas or oil-burning power plant. Generating stations 102-104 connect into electrical grid 106, which can transfer electricity to homes and businesses 110 within a region served by utility system 100, and can also transfer electricity to and from other utility systems. Electrical grid 106 transfers electricity to homes and businesses 110 through individual smart meters 108, which periodically transmit AMI signals containing electrical usage data, including kilowatt measurements and kilowatt-hour measurements, to a data center 120.

A control system within data center 120 receives the AMI signals from smart meters 108 along with weather data 112, comprising historic, current and forecasted weather information, and produces a load forecast, which is used to control generating stations 102-104 and other operations of electrical grid 106. The operations involved in computing this load forecast are discussed in more detail below.

Dynamic Prices

Figure 1B:
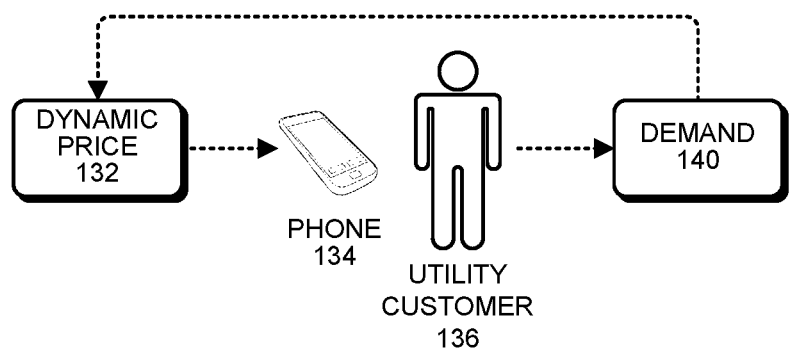
FIG. 1B illustrates how dynamic prices affect electrical load through a feedback loop in accordance with the disclosed embodiments.

FIG. 1B illustrates how dynamic prices affect electrical load through a feedback loop in accordance with the disclosed embodiments. During operation of the system, a dynamic price for power 132 is displayed to a utility customer 136 through some type of electronic device, such as a mobile phone 134. If the dynamic price 132 changes significantly, the utility consumer 136 may perform an action to modify the utility consumer's demand for power 140. For example, if the dynamic price increases significantly, the utility consumer 136 may increase a thermostat setting for an air conditioner, or may delay running a load of laundry until a later time when power is cheaper. If the aggregate demand for power 140 changes significantly, this will cause a change in the dynamic price 132, which will lead to further changes in demand in a continual feedback loop.

Generating a Loadshape Forecast

Figure 2:
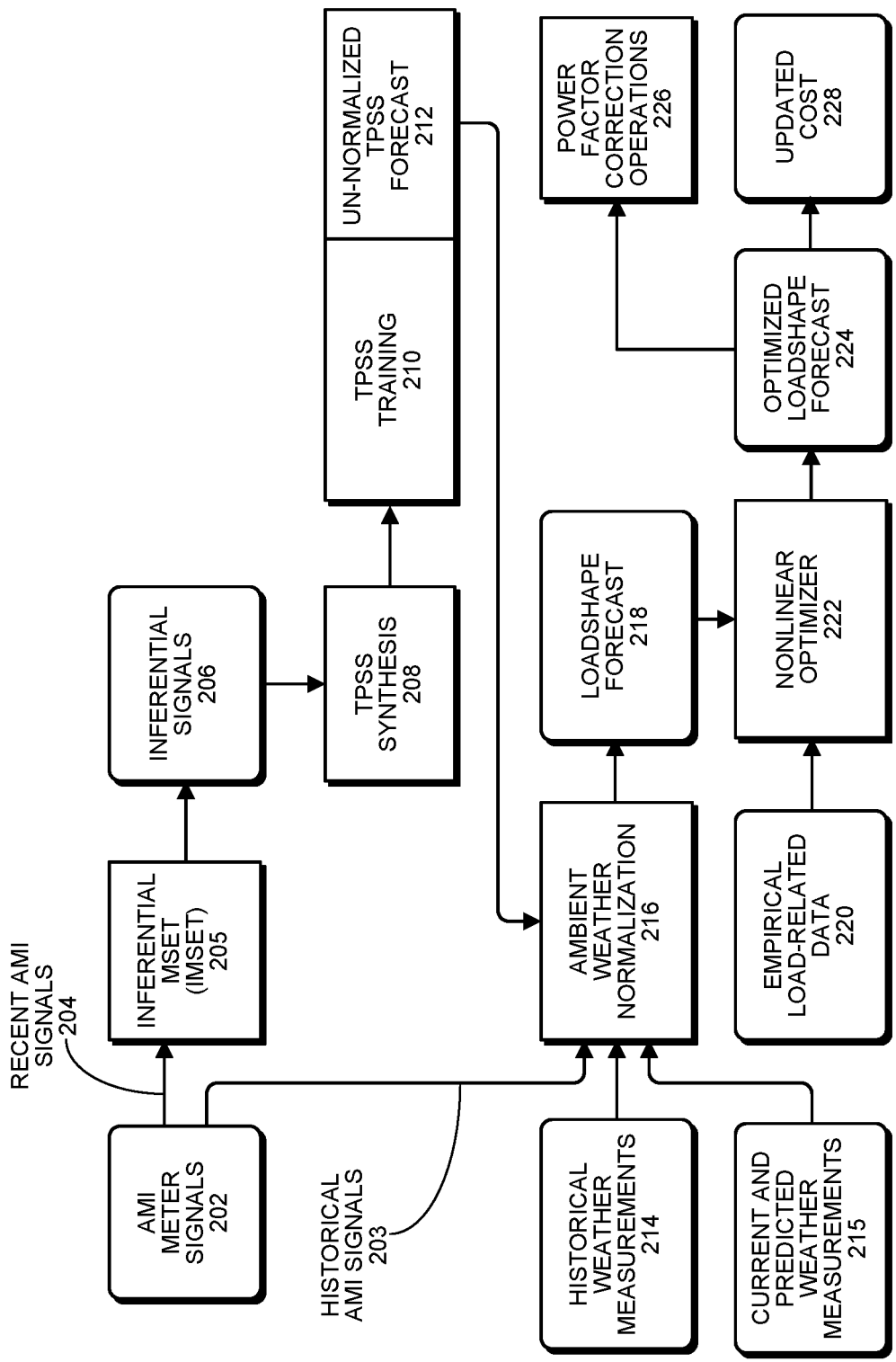
FIG. 2 presents a flow diagram illustrating how an optimized loadshape forecast is computed in accordance with the disclosed embodiments.

FIG. 2 presents a flow diagram illustrating how the above-described system computes optimized loadshape forecast 224 in accordance with the disclosed embodiments. The system starts with AMI meter signals 202 obtained from numerous smart meters by a utility system. As illustrated in FIG. 2, these AMI meter signals 202 comprise both historical AMI signals 203 and recent AMI signals 204. The system feeds the recent AMI signals 204 into an inferential MSET module 205, which trains an inferential model to learn correlations among the recent AMI signals 204, and uses the trained inferential model to produce a set of inferential signals 206. Next, the system feeds the inferential signals 206 into a TPSS synthesis module 208 that performs a TPSS training operation 210, which decomposes each signal in the set of inferential signals 206 into deterministic and stochastic components, and then uses the deterministic and stochastic components to generate a corresponding set of synthesized signals, which are statistically indistinguishable from the inferential signals. (For a more-detailed description of TPSS, please see "Spectral Decomposition and Reconstruction of Telemetry Signals from Enterprise Computing Systems," K. C. Gross and E. Schuster, Proc. 2005 IEEE International Multiconference in Computer Science & Computer Eng., Las Vegas, Nev., June 2005.) The system then projects the set of synthesized signals into the future to produce an un-normalized TPSS forecast 212 for the electricity demand for the set of utility customers.

Next, the system feeds the un-normalized TPSS forecast 212 into an ambient weather normalization module 216, which normalizes the un-normalized TPSS forecast 212 to account for variations in electricity usage caused by predicted changes in ambient weather. This normalization process involves analyzing historical AMI signals 203 with respect to historical weather measurements 214 to determine how AMI meter signals 202 change for different weather patterns. The normalization process then uses current and predicted weather measurements 215 to modify the un-normalized TPSS forecast 212 to account for the predicted weather conditions. This produces a loadshape forecast 218, which feeds into a nonlinear optimizer 222, which uses empirical load-related data to optimize the loadshape forecast 218, which accounts for the nonlinear effects of dynamic pricing and power factor correction, to produce an optimized loadshape forecast 224. (This optimization process is described in more detail in the flowchart in FIG. 3.)

Next, optimized loadshape forecast 224 is used by the utility system to perform various operations (as mentioned above) to control a supply of electricity provided by the utility system. It can also be used to optimally apply power-factor correction operations 226 for residential customers, thereby avoiding losses in residential distribution. (Such power factor correction operations are described in more detail in U.S. patent application Ser. No. 15/993,439, entitled Power Factor Correction Based on Machine Learning for Electrical Distribution Systems," by inventors Benjamin R. Franklin, Jr., et al., filed on 30 May 2018, which is incorporated by reference herein.)

Optimized loadshape forecast 224 can also be used to generate an updated cost for electricity 228, which can feed back around to further change the optimized loadshape 224 as described above.

Producing an Optimized Loadshape Forecast

Figure 3:
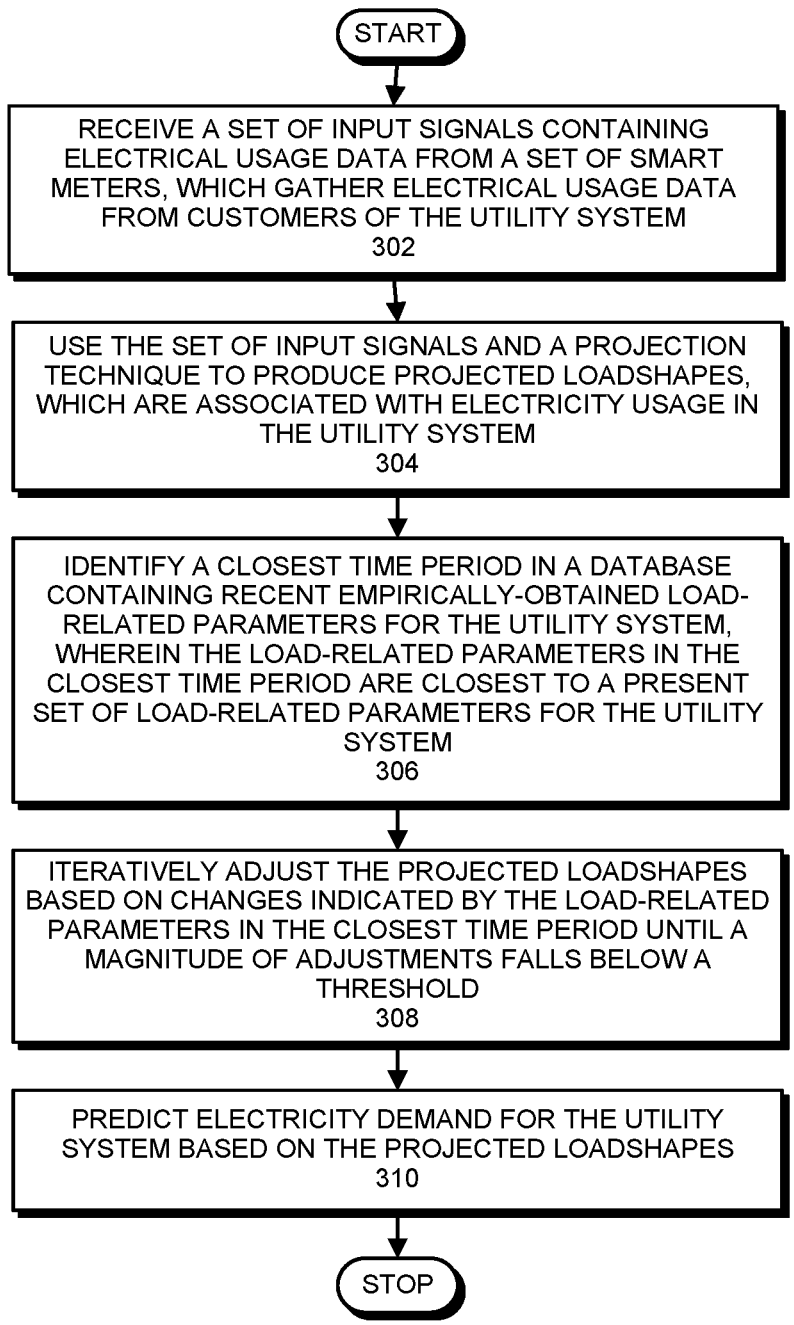
FIG. 3 presents a flowchart illustrating operations involved in forecasting an optimized loadshape, which is optimized to account for nonlinear effects resulting from the dynamic pricing in accordance with the disclosed embodiments.

FIG. 3 presents a flowchart illustrating operations involved in forecasting an optimized loadshape, which is optimized to account for nonlinear effects resulting from the dynamic pricing in accordance with the disclosed embodiments. During operation, the system receives a set of input signals containing electrical usage data from a set of smart meters, which gather electrical usage data from customers of the utility system (step 302). The system then uses the set of input signals and a projection technique to produce projected loadshapes, which are associated with electricity usage in the utility system (step 304). Next, the system optimizes the projected loadshapes to account for nonlinear effects resulting from the dynamic pricing. During this process, the system identifies a closest time period in a database containing recent empirically obtained load-related parameters for the utility system, wherein the load-related parameters in the closest time period are closest to a present set of load-related parameters for the utility system (step 306). The system then iteratively adjusts the projected loadshapes based on changes indicated by the load-related parameters in the closest time period until a magnitude of adjustments falls below a threshold (step 308). Finally, the system predicts electricity demand for the utility system based on the projected loadshapes (step 310).

Figure 4:
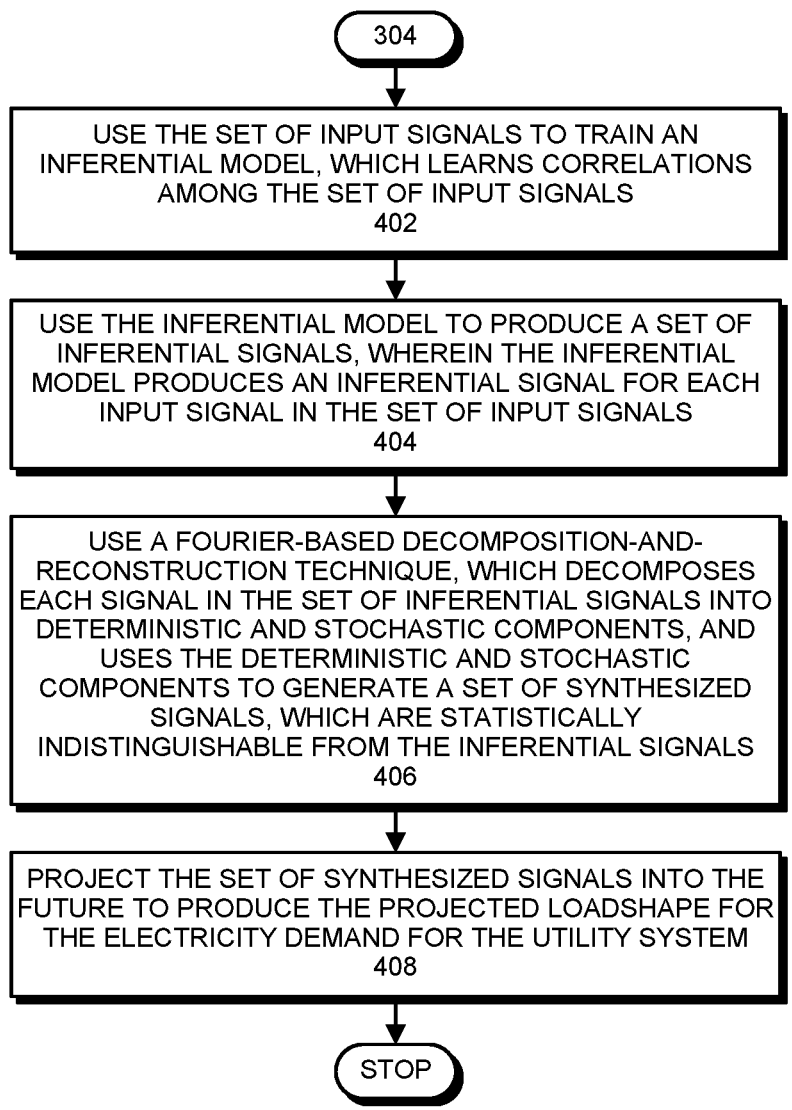
FIG. 4 presents a flowchart illustrating operations involved in using a projection technique to produce projected loadshapes in accordance with the disclosed embodiments.

FIG. 4 presents a flowchart illustrating operations involved in using a projection technique to produce projected loadshapes in accordance with the disclosed embodiments. (This flowchart provides details about the projection technique that takes place in step 304 in the flowchart in FIG. 3.) During this process, the system uses the set of input signals to train an inferential model, which learns correlations among the set of input signals (step 402). Next, the system uses the inferential model to produce a set of inferential signals, wherein the inferential model produces an inferential signal for each input signal in the set of input signals (step 404). The system then uses a Fourier-based decomposition-and-reconstruction technique, which decomposes each signal in the set of inferential signals into deterministic and stochastic components, and uses the deterministic and stochastic components to generate a set of synthesized signals, which are statistically indistinguishable from the inferential signals (step 406). Finally, the system projects the set of synthesized signals into the future to produce the projected loadshape for the electricity demand for the utility system (step 408).

Figure 5:
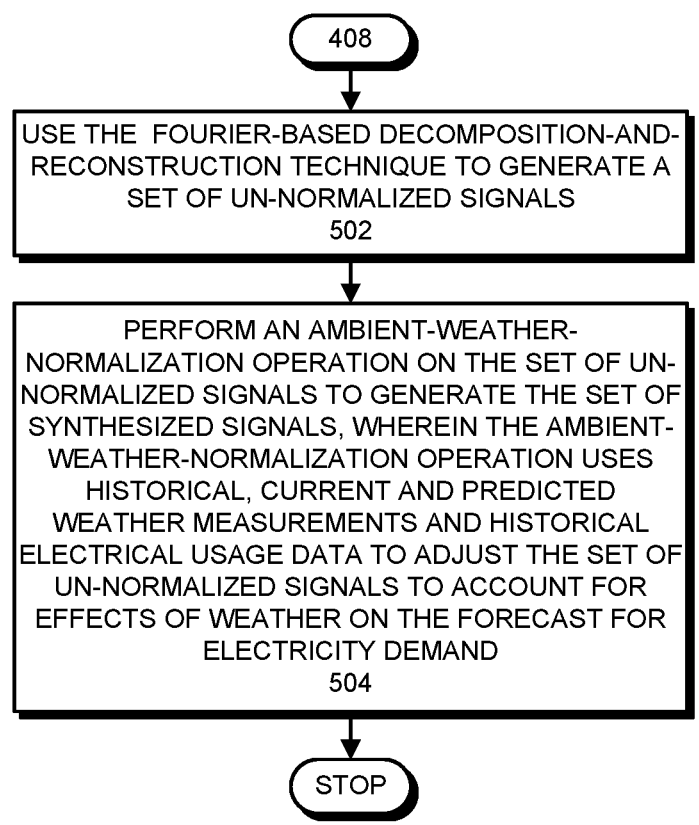
FIG. 5 presents a flowchart illustrating operations involved in performing a Fourier-based decomposition-and-reconstruction technique in accordance with the disclosed embodiments.

FIG. 5 presents a flowchart illustrating operations involved in performing the Fourier-based decomposition-and-reconstruction technique to generate the set of synthesized signals in accordance with the disclosed embodiments. (This flowchart provides details about the projection technique that takes place in step 406 in the flowchart in FIG. 4.) First, the system uses the Fourier-based decomposition-and-reconstruction technique to generate a set of un-normalized signals (step 502). Next, the system performs an ambient-weather-normalization operation on the set of un-normalized signals to generate the set of synthesized signals, wherein the ambient-weather-normalization operation uses historical, current and predicted weather measurements and historical electrical usage data to adjust the set of un-normalized signals to account for effects of weather on the forecast for electricity demand (step 504).

Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method for forecasting electricity demand in a utility system that supports dynamic pricing, comprising:
receiving a set of electronic input signals containing electrical usage data from a set of smart meters, which gather electrical usage data from customers of the utility system;
with a computer system executing an inferential machine-learning model, using the set of input signals and a projection technique to produce projected loadshapes, which are associated with electricity usage in the utility system;
optimizing the projected loadshapes, with the computer system, to account for nonlinear effects resulting from the dynamic pricing by:

identifying a closest time period in a database containing recent empirically obtained load-related parameters for the utility system, wherein the load-related parameters in the closest time period are closest to a present set of load-related parameters for the utility system, and iteratively adjusting the projected loadshapes based on changes indicated by the load-related parameters in the closest time period until a magnitude of adjustments falls below a threshold;

predicting electricity demand for the utility system based on the projected loadshapes; and using the predicted electricity demand to automatically control a supply of electricity provided by the utility system.

2. The method of claim 1, wherein the load-related parameters include one or more of the following:
a present time of day;
a present demand for electricity;
a present cost for electricity; and
a present rate of change in the cost for electricity.

3. The method of claim 1, wherein controlling the supply of electricity provided by the utility system comprises one or more of the following:
controlling an amount of electricity produced by one or more power plants in the utility system;
purchasing electricity for the utility system through a power grid;
selling electricity produced by the utility system through the power grid;
storing electricity for future use by the utility system; and
making plans to construct a new power plant for the utility system.

4. The method of claim 1, wherein using the set of input signals and the projection technique to produce projected loadshapes comprises:
using the set of input signals to train an inferential model, which learns correlations among the set of input signals;
using the inferential model to produce a set of inferential signals, wherein the inferential model produces an inferential signal for each input signal in the set of input signals;
using a Fourier-based decomposition-and-reconstruction technique, which decomposes each signal in the set of inferential signals into deterministic and stochastic components, and using the deterministic and stochastic components to generate a set of synthesized signals, which are statistically indistinguishable from the inferential signals; and
projecting the set of synthesized signals into the future to produce the projected loadshape for the electricity demand for the utility system.

5. The method of claim 4, wherein generating the set of synthesized signals comprises:
using the Fourier-based decomposition-and-reconstruction technique to generate a set of un-normalized signals; and
performing an ambient-weather-normalization operation on the set of un-normalized signals to generate the set of synthesized signals, wherein the ambient-weather-normalization operation uses historical, current and predicted weather measurements and historical electrical usage data to adjust the set of un-normalized signals to account for effects of weather on the forecast for electricity demand.

6. The method of claim 4, wherein using the Fourier-based decomposition-and-reconstruction technique to generate the set of synthesized signals comprises using a telemetry parameter synthesis (TPSS) technique, which creates a high-fidelity synthesis equation that is used to generate the set of synthesized signals.

7. The method of claim 1, wherein the method further comprises using predicted reactive and resistive loads in the predicted electricity demand to optimize power factor correction operations for residential utility customers.

8. The method of claim 4, wherein the inferential model is trained using a Multivariate State Estimation Technique (MSET).

9. The method of claim 1, wherein receiving the set of input signals comprises receiving a set of advanced metering infrastructure (AMI) signals.

10. A non-transitory computer-readable storage medium storing instructions that when executed by a computer cause the computer to perform a method for forecasting electricity demand in a utility system that supports dynamic pricing, the method comprising:
receiving a set of electronic input signals containing electrical usage data from a set of smart meters, which gather electrical usage data from customers of the utility system;
executing an inferential machine-learning model that uses the set of input signals and a projection technique to produce projected loadshapes, which are associated with electricity usage in the utility system;
optimizing the projected loadshapes to account for non-linear effects resulting from the dynamic pricing by:
identifying a closest time period in a database containing recent empirically obtained load-related parameters for the utility system, wherein the load-related parameters in the closest time period are closest to a present set of load-related parameters for the utility system, and
iteratively adjusting the projected loadshapes based on changes indicated by the load-related parameters in the closest time period until a magnitude of adjustments falls below a threshold;
predicting electricity demand for the utility system based on the projected loadshapes; and
using the predicted electricity demand to automatically control a supply of electricity provided by the utility system.

11. The non-transitory computer-readable storage medium of claim 10, wherein the load-related parameters include one or more of the following:
a present time of day;
a present demand for electricity;
a present cost for electricity; and
a present rate of change in the cost for electricity.

12. The non-transitory computer-readable storage medium of claim 10, wherein controlling the supply of electricity provided by the utility system comprises one or more of the following:
controlling an amount of electricity produced by one or more power plants in the utility system;
purchasing electricity for the utility system through a power grid;
selling electricity produced by the utility system through the power grid;
storing electricity for future use by the utility system; and
making plans to construct a new power plant for the utility system.

13. The non-transitory computer-readable storage medium of claim 10, wherein using the set of input signals and the projection technique to produce projected loadshapes comprises:
- using the set of input signals to train an inferential model, which learns correlations among the set of input signals;
- using the inferential model to produce a set of inferential signals, wherein the inferential model produces an inferential signal for each input signal in the set of input signals;
- using a Fourier-based decomposition-and-reconstruction technique, which decomposes each signal in the set of inferential signals into deterministic and stochastic components, and using the deterministic and stochastic components to generate a set of synthesized signals, which are statistically indistinguishable from the inferential signals; and
- projecting the set of synthesized signals into the future to produce the projected loadshape for the electricity demand for the utility system.

14. The non-transitory computer-readable storage medium of claim 13, wherein generating the set of synthesized signals comprises:
- using the Fourier-based decomposition-and-reconstruction technique to generate a set of un-normalized signals; and
- performing an ambient-weather-normalization operation on the set of un-normalized signals to generate the set of synthesized signals, wherein the ambient-weather-normalization operation uses historical, current and predicted weather measurements and historical electrical usage data to adjust the set of un-normalized signals to account for effects of weather on the forecast for electricity demand.

15. The non-transitory computer-readable storage medium of claim 13, wherein using the Fourier-based decomposition-and-reconstruction technique to generate the set of synthesized signals comprises using a telemetry parameter synthesis (TPSS) technique, which creates a high-fidelity synthesis equation that is used to generate the set of synthesized signals.

16. The non-transitory computer-readable storage medium of claim 10, wherein the method further comprises using predicted reactive and resistive loads in the predicted electricity demand to optimize power factor correction operations for residential utility customers.

17. A system that forecasts electricity demand for a utility system, comprising:
- at least one processor and at least one associated memory; and
- a prediction mechanism that executes on the at least one processor, wherein during operation, the prediction mechanism:
  - receives a set of electronic input signals containing electrical usage data from a set of smart meters, which gather electrical usage data from customers of the utility system;
  - executes an inferential machine-learning model that uses the set of input signals and a projection technique to produce projected loadshapes, which are associated with electricity usage in the utility system;
  - optimizes the projected loadshapes to account for non-linear effects resulting from the dynamic pricing by, wherein optimizing the projected loadshapes involves:
    - identifying a closest time period in a database containing recent empirically obtained load-related parameters for the utility system, wherein the load-related parameters in the closest time period are closest to a present set of load-related parameters for the utility system, and
    - iteratively adjusting the projected loadshapes based on changes indicated by the load-related parameters in the closest time period until a magnitude of adjustments falls below a threshold;
  - predicts electricity demand for the utility system based on the projected loadshapes; and
  - using the predicted electricity demand to automatically control a supply of electricity provided by the utility system.

18. The system of claim 17, wherein the load-related parameters include one or more of the following:
- a present time of day;
- a present demand for electricity;
- a present cost for electricity; and
- a present rate of change in the cost for electricity.

* * * * *